(12) United States Patent
Muehlhausen et al.

(10) Patent No.: US 10,176,820 B2
(45) Date of Patent: *Jan. 8, 2019

(54) REAL-TIME REMODELING OF USER VOICE IN AN IMMERSIVE VISUALIZATION SYSTEM

(71) Applicant: Microsoft Technology Licensing, LLC, Redmond, WA (US)

(72) Inventors: Andrew Frederick Muehlhausen, Seattle, WA (US); Matthew Johnston, Seattle, WA (US); Kasson Crooker, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/400,032

(22) Filed: Jan. 6, 2017

(65) Prior Publication Data

US 2017/0117002 A1 Apr. 27, 2017

Related U.S. Application Data

(63) Continuation of application No. 14/641,174, filed on Mar. 6, 2015, now Pat. No. 9,558,760.

(51) Int. Cl.
*G06F 3/16* (2006.01)
*G10L 21/02* (2013.01)
(Continued)

(52) U.S. Cl.
CPC ........ *G10L 21/0202* (2013.01); *A63F 13/215* (2014.09); *A63F 13/54* (2014.09);
(Continued)

(58) Field of Classification Search
CPC ..... G10L 13/033; G06F 3/011; G02B 27/017; G06T 19/006
See application file for complete search history.

(56) References Cited

U.S. PATENT DOCUMENTS 5,495,576 A * 2/1996 Ritchey .................. G06T 17/00
345/420
5,513,129 A * 4/1996 Bolas ...................... G06F 3/011
703/13

(Continued)

FOREIGN PATENT DOCUMENTS

CN 1469682 A 1/2004
CN 102572308 A 7/2012
(Continued)

OTHER PUBLICATIONS

"Virtual Reality Headset", Retrieved From <<http://www.scienceclarified.com/Ti-Vi/Virtual-Reality.html>>, Jul. 2, 2006, 8 Pages.
(Continued)

*Primary Examiner* — Jialong He
(74) *Attorney, Agent, or Firm* — Arent Fox LLP (57) ABSTRACT

A visualization system with audio capability includes one or more display devices, one or more microphones, one or more speakers, and audio processing circuitry. While a display device displays an image to a user, a microphone inputs an utterance of the user, or a sound from the user's environment, and provides it to the audio processing circuitry. The audio processing circuitry processes the utterance (or other sound) in real-time to add an audio effect associated with the image to increase realism, and outputs the processed utterance (or other sound) to the user via the speaker in real-time, with very low latency.

20 Claims, 11 Drawing Sheets

(51) Int. Cl.

| | | |
|---|---|---|
| *G10L 21/034* | (2013.01) | |
| *G06T 19/00* | (2011.01) | |
| *G02B 27/01* | (2006.01) | |
| *G06F 3/01* | (2006.01) | |
| *G10L 21/003* | (2013.01) | |
| *A63F 13/54* | (2014.01) | |
| *A63F 13/215* | (2014.01) | |
| *H04S 7/00* | (2006.01) | |
| *G06T 17/05* | (2011.01) | |

(52) U.S. Cl.
CPC ....... *G02B 27/017* (2013.01); *G02B 27/0172* (2013.01); *G06F 3/011* (2013.01); *G06F 3/012* (2013.01); *G06T 17/05* (2013.01); *G06T 19/006* (2013.01); *G10L 21/003* (2013.01); *G10L 21/034* (2013.01); *H04S 7/304* (2013.01); *G02B 2027/014* (2013.01); *G02B 2027/0138* (2013.01); *G02B 2027/0178* (2013.01); *G10L 21/02* (2013.01); *H04S 2400/15* (2013.01); *H04S 2420/01* (2013.01)

(56) References Cited

U.S. PATENT DOCUMENTS

| | | | |
|---|---|---|---|
| 6,009,210 A | 12/1999 | Kang | |
| 6,301,845 B1* | 10/2001 | Milanian | E04H 3/02 472/59 |
| 6,409,599 B1 | 6/2002 | Sprout et al. | |
| 6,723,910 B1 | 4/2004 | Tsou et al. | |
| 6,978,027 B1 | 12/2005 | Dahl et al. | |
| 6,987,514 B1* | 1/2006 | Beresin | G10L 13/033 345/473 |
| 7,116,323 B2* | 10/2006 | Kaye | G06T 5/005 345/419 |
| 7,401,920 B1* | 7/2008 | Kranz | A61B 3/113 351/209 |
| 8,243,970 B2* | 8/2012 | Dent | H04R 5/02 381/1 |
| 8,831,255 B2* | 9/2014 | Crawford | H04S 7/304 381/17 |
| 2003/0007648 A1 | 1/2003 | Currell | |
| 2004/0041822 A1* | 3/2004 | Iizuka | G06T 15/005 345/634 |
| 2006/0133619 A1* | 6/2006 | Curry | H04M 3/56 381/26 |
| 2006/0238877 A1* | 10/2006 | Ashkenazi | G02B 27/0093 359/630 |
| 2007/0168359 A1 | 7/2007 | Jacob et al. | |
| 2007/0196801 A1* | 8/2007 | Nagasaka | G09B 23/28 434/262 |
| 2007/0260984 A1* | 11/2007 | Marks | A63F 13/06 715/706 |
| 2010/0009750 A1* | 1/2010 | Egozy | A63F 13/005 463/35 |
| 2010/0145701 A1* | 6/2010 | Kaneko | A63F 13/10 704/258 |
| 2010/0197401 A1* | 8/2010 | Altshuler | A63F 13/10 463/35 |
| 2010/0306713 A1* | 12/2010 | Geisner | G06F 3/0481 715/863 |
| 2012/0068914 A1* | 3/2012 | Jacobsen | G06F 1/163 345/8 |
| 2012/0194516 A1 | 8/2012 | Newcombe et al. | |
| 2012/0206452 A1* | 8/2012 | Geisner | G02B 27/017 345/419 |
| 2012/0324213 A1* | 12/2012 | Ho | G06F 1/1626 713/100 |
| 2013/0083003 A1* | 4/2013 | Perez | G06F 3/005 345/419 |
| 2013/0236040 A1* | 9/2013 | Crawford | H04S 7/304 381/310 |
| 2013/0307855 A1* | 11/2013 | Lamb | G02B 27/225 345/473 |
| 2013/0307856 A1* | 11/2013 | Keane | G10L 21/10 345/473 |
| 2014/0071163 A1* | 3/2014 | Kinnebrew | G03H 1/2249 345/633 |
| 2014/0139551 A1* | 5/2014 | McCulloch | G09G 5/377 345/633 |
| 2014/0328505 A1 | 11/2014 | Heinemann et al. | |
| 2014/0372957 A1 | 12/2014 | Keane et al. | |
| 2015/0055937 A1* | 2/2015 | Van Hoff | H04N 13/0014 386/285 |
| 2015/0058102 A1* | 2/2015 | Christensen | G11B 27/11 705/14.6 |
| 2016/0088417 A1 | 3/2016 | Kim et al. | |

FOREIGN PATENT DOCUMENTS

| | | |
|---|---|---|
| JP | 2005080124 A | 3/2005 |
| TW | 560217 B | 11/2003 |
| WO | 2014178479 A1 | 11/2014 |

OTHER PUBLICATIONS

"Web Audio Processing: Use Cases and Requirements", In Proceedings of W3C Working Group Note, Jan. 29, 2013, 19 Pages.

"Non-Final Office Action Issued in U.S Appl. No. 14/641,174", dated Apr. 26, 2016, 14 Pages.

"Notice of Allowance Issued in U.S. Appl. No. 14/641,174", dated Sep. 19, 2016, 17 Pages.

Casey, et al., "Vision Steered Beam-forming and Transaural Rendering for the Artificial Life Interactive Video Environment, (ALIVE)", In Proceedings of the 99th Conference on Audio Engineering Society, Nov. 1, 1995, 28 Pages.

Healy, et al., "An Outdoor Spatially-Aware Audio Playback Platform Exemplified by a Virtual Zoo", In Proceedings of the 17th International Conference on Multimedia, Oct. 19, 2009, 3 Pages.

Kapralos, Bill, "Auditory Perception & Virtual Environments", Retrieved From <<http://www.cs.yorku.ca/~billk/spatialSoundTalk.pdf>>, Jan. 27, 2003, 17 Pages.

Otsuki, et al., "Novel Interaction Methods with Mixed Reality Space", In the Proceedings of SICE Annual Conference, Aug. 20, 2008, pp. 456-460.

"International Search Report and Written Opinion Issued in PCT Application No. PCT/US2016/017050", dated May 10, 2016, 14 Pages.

Wang, et al., "Collaborative Design in Virtual Environments", In Proceedings of International Series on Intelligent Systems, Control, and Automation: Science and Engineering, vol. 48, Retrieved on: Dec. 5, 2014, 251 Pages.

Slater, et al., "A Framework for Immersive Virtual Environments (FIVE): Speculations on the Role of Presence in Virtual Environments", In Journal of Presence: Teleoperators and Virtual Environments, vol. 6, No. 6, Dec. 1997, 20 Pages.

Tiete, et al., "SoundCompass: A Distributed MEMS Microphone Array-Based Sensor for Sound Source Localization", In Journal of Sensors (Basel), Jan. 23, 2014, 30 Pages.

Tonnesen, et al., "3D Sound Synthesis", Retrieved From <<http://www.hitl.washington.edu/projects/knowledge_base/virtual-worlds/EVE/I.B.1.3DSoundSynthesis.html>>, Apr. 30, 1997, 7 Pages.

"Second Written Opinion Issued in PCT Application No. PCT/US2016/017050", dated Feb. 15, 2017, 6 Pages.

* cited by examiner

REAL-TIME REMODELING OF USER VOICE IN AN IMMERSIVE VISUALIZATION SYSTEM

This application is a continuation of U.S. patent application Ser. No. 14/641,174, filed on Mar. 6, 2015, which is incorporated herein by reference in its entirety.

FIELD OF THE INVENTION

At least one embodiment of the present invention pertains to virtual reality and augmented reality visualization systems, and more particularly, to a technique for processing audio in such systems.

BACKGROUND

As virtual reality (VR) and augmented reality (AR) technology matures, VR and AR visualization systems are starting to be introduced into the mainstream consumer electronics marketplace. AR Head Mounted Display (HMD) devices ("AR-HMD devices") are one promising application of such technology. These devices may include transparent display elements that enable a user to see concurrently both the real world around them and virtual content that is generated and displayed by the device. Virtual content that appears to be superimposed over a real-world view is commonly referred to as AR content.

VR and AR visualization systems can provide users with entertaining, immersive virtual environments in which they can visually and audibly experience things they might not normally experience in real life. In such environments, however, the perceived realism of the environment may be degraded if a user speaks or issues voice commands and the user's voice does not sound consistent with what the user sees, including the displayed virtual content.

SUMMARY

The technique introduced here includes an audio processing method by which an AR or VR visualization system can produce sound that is more consistent with the displayed imagery that the user sees, and which is therefore more realistic. In certain embodiments of the method, an HMD device displays an image of a physical thing to a user of the device, over a real world view of an environment of the user. The HMD device then inputs voice of the user via a microphone while the image is being displayed to the user, dynamically processes user voice data in real-time to incorporate an audio effect corresponding to the physical thing while the image is still being displayed, and then outputs in real-time, via a speaker, sound representing the voice of the user as affected by the physical thing, based on the dynamically modified user voice data, while the image is being displayed to the user. Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is an audio processing method by which an AR or VR visualization system, such as an AR-HMD, can produce sound that is more consistent with the displayed imagery that the user sees, and which is therefore more realistic. The technique greatly helps to augment suspension of disbelief by the user by providing innate and nearly instantaneous audible feedback from the "inside" of a virtual environment.

In particular, by using low-latency beam-forming microphones combined with a low-latency head-mounted audio output, the technique processes a user's voice with one or more audio effects and presents it back to the user in real-time as a realistic part of that virtual world. For example, if the user is speaking in a virtual church in an AR or VR environment, the user can hear his or her own voice (e.g., from head-mounted speakers of the visualization device) reverberating as though he or she is in a real church. If the user is virtually underwater and speaks, the sound can be muffled and/or processed with a "bubbles" effect, so that it sounds to the user as though he or she is actually underwater. The user can dip his or her head in and out of virtual water and hear the change in realtime, for example.

The technique introduced here also use head-tracking capability and head related transform function (HRTF) data to provide positional awareness and place auditory reflections at the correct locations within virtual scene. For example, a user can yell into a virtual canyon and hear the voice echoing back from that exact location even while moving and looking around, and be able to pinpoint the direction from which the echo originates.

By utilizing a microphone array in different combinations, it is also possible to isolate different objects from the user's real-world environment. Specifically, the microphones can directly target the user's own voice and/or other people. To minimize latency, the isolated audio input signal can be accessed along the shortest possible hardware and software route in the visualization device. Digital signal processing can be done on dedicated hardware on the visualization device, or on a main processor of the visualization device, causing a negligible (but undesirable) amount of lag.

Other examples of how the audio processing technique can be applied include visually and audibly simulating the user being in a cave, underwater, sky-diving, or role-playing (e.g., being a giant, tiny person, robot, or alien). The user might, for example, see a virtual cave displayed in a wall of a room, and hear the echo of his voice coming from that location in the room while moving about the room. The technique introduced here can also be used to affect the voices of other people and/or other real-world objects near the user. For example, the system might enable the user to make his or her parents sound like the "Lollipop Guild" from The Wizard of Oz in real-time.

Figure 1A:
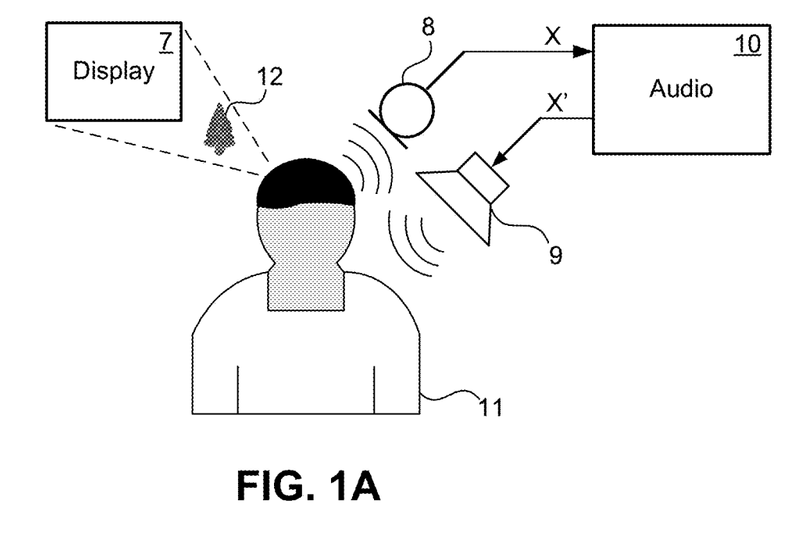
FIG. 1A schematically illustrates the audio processing technique introduced here.

FIG. 1A schematically illustrates the audio processing technique introduced here. A visualization system with audio capability includes one or more display devices 7, one or more microphones 8, one or more speakers 9, and audio processing circuitry 10. While the display device 7 displays an image 12 to a user 11, a microphone 8 inputs an utterance X of the user 11 (or a sound from the user's environment) and provides it to the audio processing circuitry 10. The audio processing circuitry 10 processes the utterance (or other sound) X in real-time to add an audio effect associated with the image 12 to increase realism, and outputs the processed utterance (or other sound) X' to the user 11 via the speaker 9 in real-time, all with very low latency.

Figure 1B:
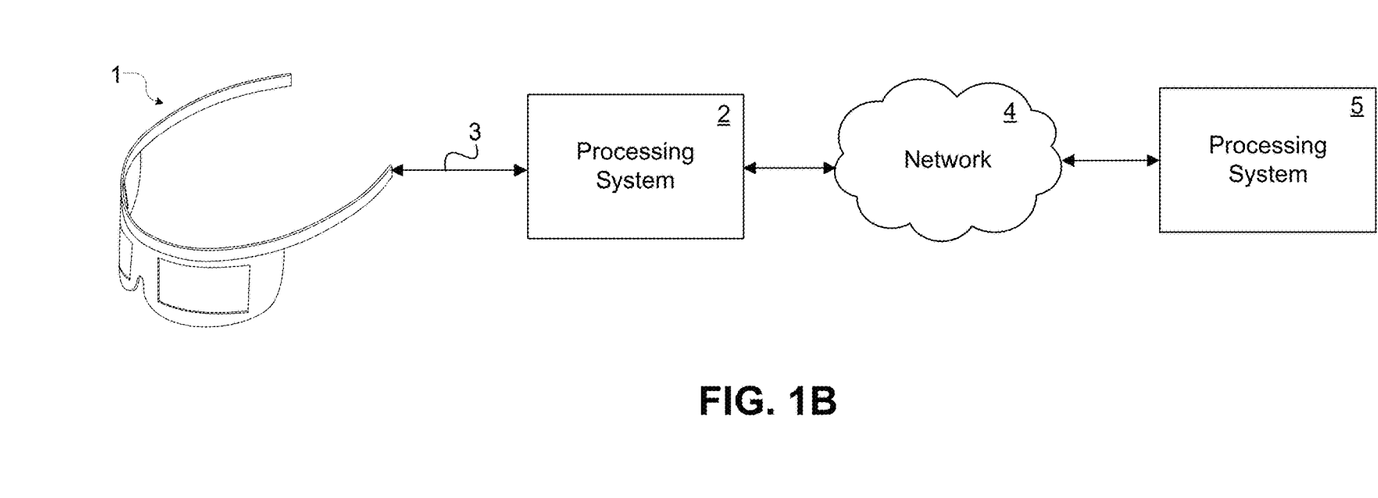
FIG. 1B shows an example of an environment including an AR-HMD device that can implement the audio processing technique introduced here.

FIG. 1B shows an example of an environment including an AR-HMD device that can implement the audio processing technique. In the illustrated example, the AR-HMD device 1 is configured to communicate data to and from an external processing device 2 through a connection 3, which can be a wired connection, a wireless connection, or a combination thereof. In other use cases, however, the AR-HMD device 1 may operate as a standalone device. The connection 3 can be configured to carry any kind of data, such as image data (e.g., still images and/or full-motion video, including 2D and 3D images), audio data (including voice), multimedia, and/or any other type(s) of data. The processing system 2 may be, for example, a game console, personal computer, tablet computer, smartphone, or other type of processing device. The connection 13 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), or the like, or a combination thereof. Additionally, the processing system 2 may communicate with one or more other processing systems 5 via a network 4, which may be or include, for example, a local area network (LAN), a wide area network (WAN), an intranet, a metropolitan area network (MAN), the global Internet, or a combination thereof.

Figure 2:
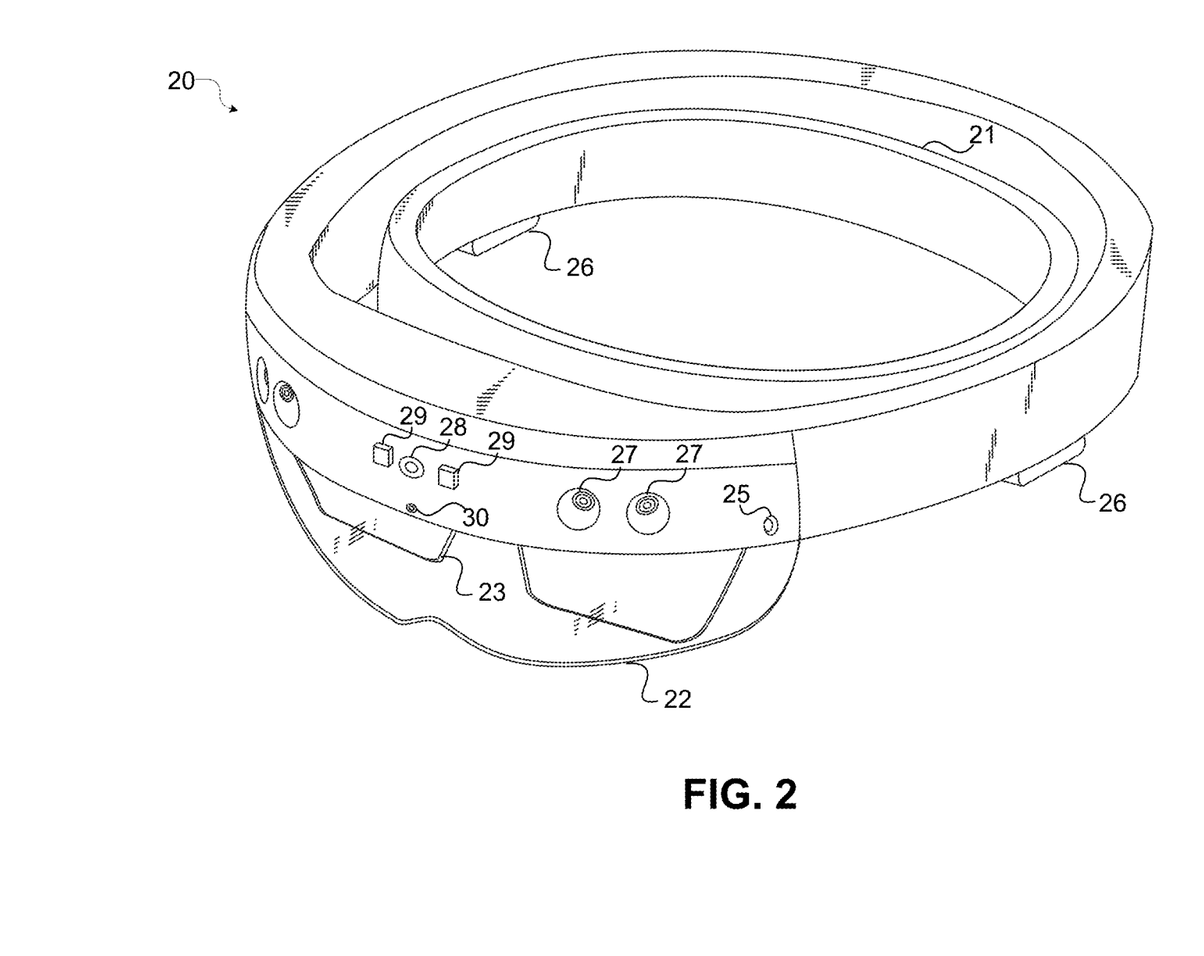
FIG. 2 shows a perspective view of an AR-HMD device in which the audio processing technique can be implemented.

FIG. 2 shows a perspective view of an illustrative AR-HMD device that can incorporate the audio processing technique introduced here, according to one embodiment. The AR-HMD device 20 can be an embodiment of AR-HMD device 1 in FIG. 1. AR-HMD device 21 includes a headband 21 by which the AR-HMD device 20 can be worn on a user's head. Attached to the headband 21 (directly or indirectly) is a transparent protective visor 22 that encloses one or more transparent AR display devices 23, each of which can overlay images on the user's view of his real-world environment, for one or both eyes (e.g., by projecting light into the user's eyes). The protective visor 22 also encloses various circuitry (not shown) and sensors.

The AR-HMD device 20 further includes two or more microphones 25 (although only one is shown in FIG. 2) to input speech from the user (e.g., for use in recognizing voice commands and providing audio effects); two or more audio speakers 26 to output sound to the user; one or more visible-spectrum tracking cameras 27 for use in capturing images of surrounding surfaces to allow tracking of the user's head position and orientation in real-world space; one or more infrared (IR) spectrum depth cameras 28 for use in determining distances to nearby surfaces (e.g., for use in surface reconstruction to model the user's environment); one or more IR illumination sources 29 for use with the depth camera(s) 28; one or more visible spectrum video cameras 30 for use in capturing standard video of what the user sees. The AR-HMD device 20 also includes circuitry (not shown), which may be contained within the visor 22, to control at least some of the aforementioned elements and perform associated data processing functions. The circuitry may include, for example, one or more processors and one or more memories. Note that in other embodiments the aforementioned components may be located in different locations on the AR-HMD device 20. Additionally, some embodiments may omit some of the aforementioned components and/or may include additional components not mentioned above.

Figure 3:
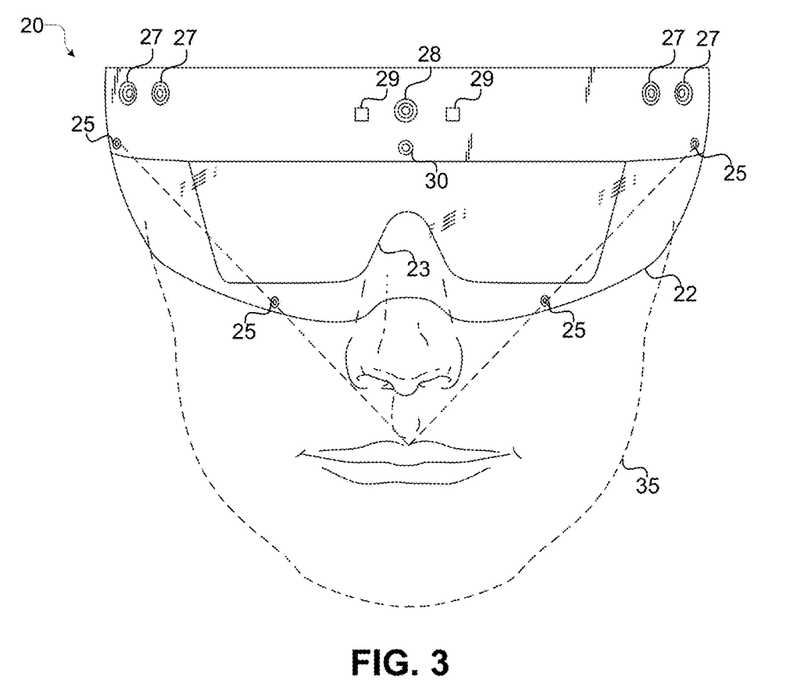
FIG. 3 illustrates a front elevation view of the AR-HMD device.
Figure 4:
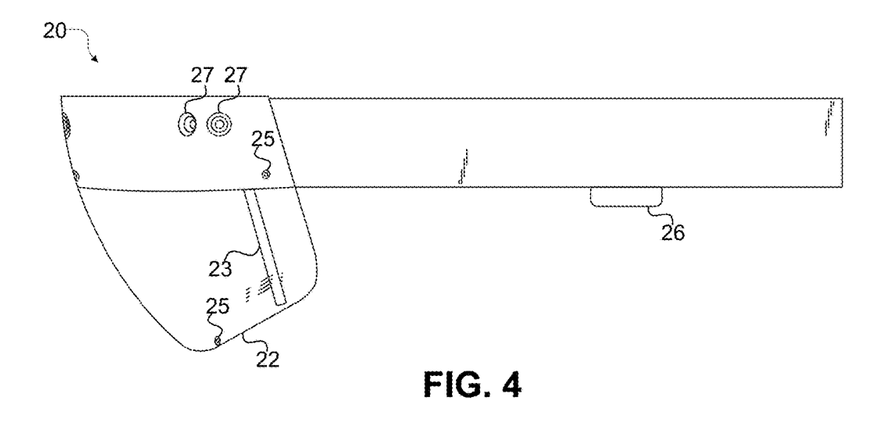
FIG. 4 illustrates a side elevation view of the AR-HMD device.

FIG. 3 illustrates a front elevation view of the AR-HMD device 20, while FIG. 4 shows a corresponding left-side elevation view of the AR-HMD device 20. In the illustrated embodiment, the AR-HMD device 20 includes four microphones 25. In some embodiments the microphones 25 are grouped into one or more beamforming arrays to provide directionality, such as a pair of left side microphones and a pair of right side microphones, as discussed further below. In the illustrated embodiment, in each of the left- and right-side microphone pairs, one microphone of the pair is mounted approximately at the temple of the user 35 while the other microphone is mounted approximately over the cheekbone of the user 35. In some embodiments, the distance between the top and bottom microphone on each side is approximately 20-25 mm. to facilitate beamforming, the two microphones of each pair (left and right) are positioned along an imaginary line drawn from the center of the (typical) user's mouth to the nearest temple microphone, to facilitate audio input beamforming to isolate the user's voice from other sounds in the environment, as discussed further below. Note that other microphone configurations are possible consistent with the technique introduced here, where the number and/or locations of the microphones may vary from that shown in FIG. 3.

Figure 5:
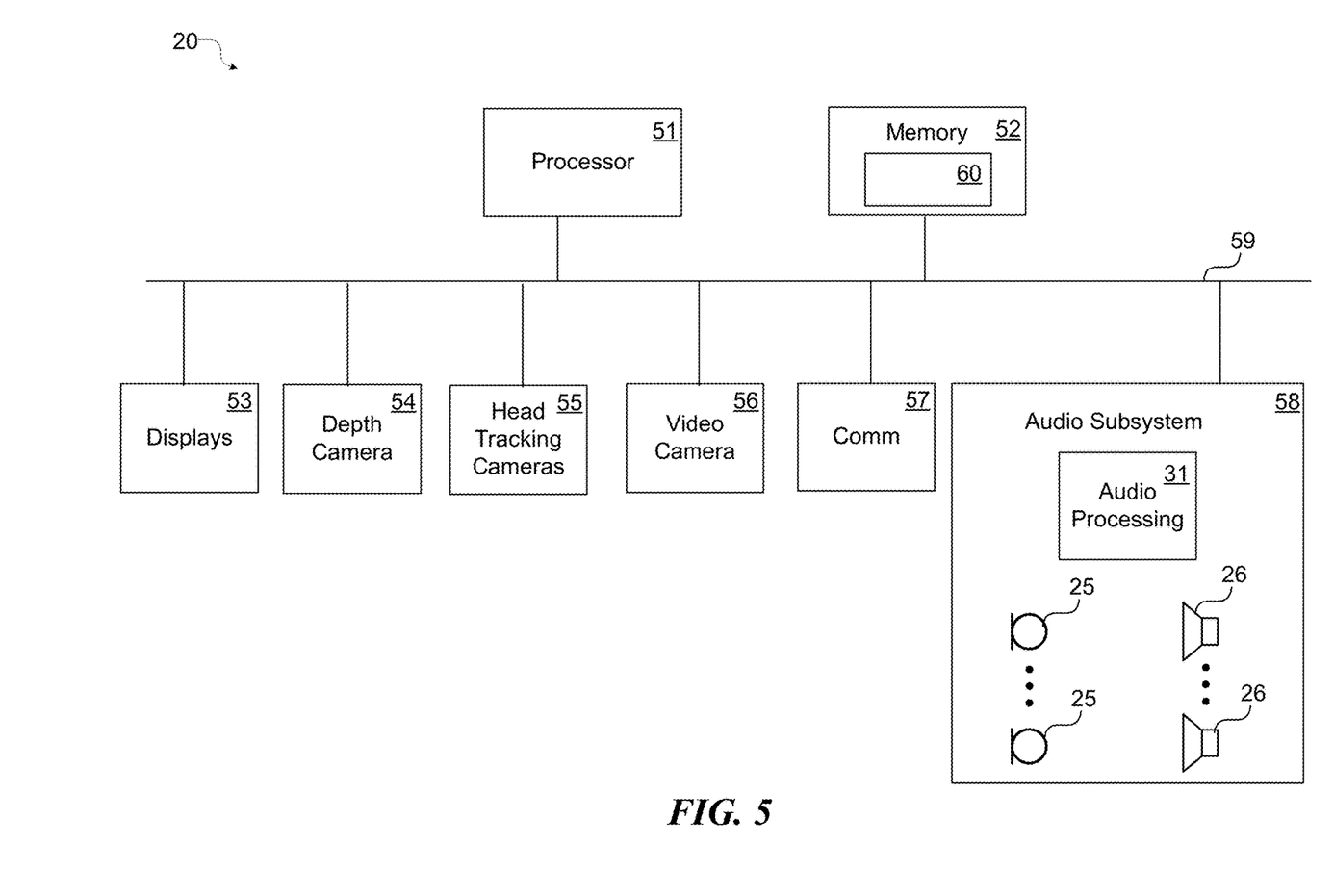
FIG. 5 is a block diagram showing an example of various functional components of an AR-HMD device.

FIG. 5 shows an example of various functional components of the AR-HMD device 20, according to some embodiments. In FIG. 5, the functional components of the AR-HMD device 20 include one or more instance of each of the following: a main processor 51, memory 52, transparent display devices 53, depth camera 54, head tracking cameras 55, video camera 56, communication device 57, and an audio subsystem 58, all coupled together (directly or indirectly) by an interconnect 59. The interconnect 59 may be or include one or more conductive traces, buses, point-to-point connections, controllers, adapters, wireless links and/or other conventional connection devices and/or media, at least some of which may operate independently of each other.

The main processor(s) 51 individually and/or collectively control the overall operation of the AR-HMD device 20 and perform various data processing functions. Additionally, in some embodiments the processor(s) 51 may provide at least some of the audio processing functionality described herein. Each processor 51 can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Data and instructions (code) 60 that configure the processor(s) 51 to execute aspects of the technique introduced here can be stored in the one or more memories 52. Each memory 52 can be or include one or more physical storage devices, which may be in the form of random access memory (RAM), read-only memory (ROM) (which may be erasable and programmable), flash memory, miniature hard disk drive, or other suitable type of storage device, or a combination of such devices.

The depth camera 54 can apply time-of-flight principles, for example, to determine distances to nearby objects. The distance information acquired by the depth camera 54 is used (e.g., by processor(s) 51) to construct a 3D mesh model of the surfaces in the user's environment. The head tracking cameras 25 enable the AR-HMD device 20 to continuously track the current location and orientation of the user's head by acquiring images of the user's real-world environment. At least some of the functionality associated with surface detection and head tracking may be performed by the processor(s) 51.

The one or more communication devices 57 enable the AR-HMD device 20 to receive data and/or commands from, and send data and/or commands to an external processing system, such as a personal computer or game console. Each communication device 57 can be or include, for example, a universal serial bus (USB) adapter, Wi-Fi transceiver, Bluetooth or Bluetooth Low Energy (BLE) transceiver, Ethernet adapter, cable modem, DSL modem, cellular transceiver (e.g., 3G, LTE/4G or 5G), baseband processor, or the like, or a combination thereof.

The audio subsystem 58 performs at least some of the audio processing technique introduced here, and includes, for example, low-latency beam-forming microphones 25 and speakers 26, as well as audio processing circuitry 31 (which may include and/or execute software) to process a user's voice with audio effects and present it back to the user as a realistic part of that virtual audio world. Note, however, that in some embodiments, the audio processing may be performed by at least partially by the main processor(s) 51 of the AR-HMD device 20. The technique introduced here involves inputting sound from the user and/or his environment, processing that sound in real-time to add an audio effect (e.g., an echo or underwater effect), and then outputting the processed version of that sound via speakers of the AR-HMD device 20, such that there is very little delay (e.g., no more than about 50 milliseconds) from the time the input sound hits the microphones 25 to the time the corresponding processed audio is output from the speakers 26. In certain embodiments, the low latency is achieved, at least in part, by performing all audio processing at the lowest level possible in the hardware/software hierarchy. For example, to minimize latency it may be advantageous to perform all of this audio processing within the audio subsystem, rather than using the main processor(s) 21 of the device 20. Nonetheless, alternative embodiments of the AR-HMD device 20 may have sufficiently fast hardware to allow the main processor(s) 21 to perform some or all of this audio processing.

In some embodiments, the microphones 25 are omnidirectional microelectromechanical systems (MEMS) type microphones. In other embodiments, they may be unidirectional electret condenser microphones (ECMs), for example, or another type of microphone. Preferably the microphones have signal-to-noise ratios greater than 65 dB, flat response up to approximately 15 KHz, and sensitivity tolerance of approximately ±1 dB. Note that matching the microphones in terms of tolerance may be important for optimal beamforming performance. If omnidirectional microphones are used, then beamforming can be used to achieve directionality, which may be useful to isolate the user's voice from voices of other people and other sounds in the user's environment.

Figure 6:
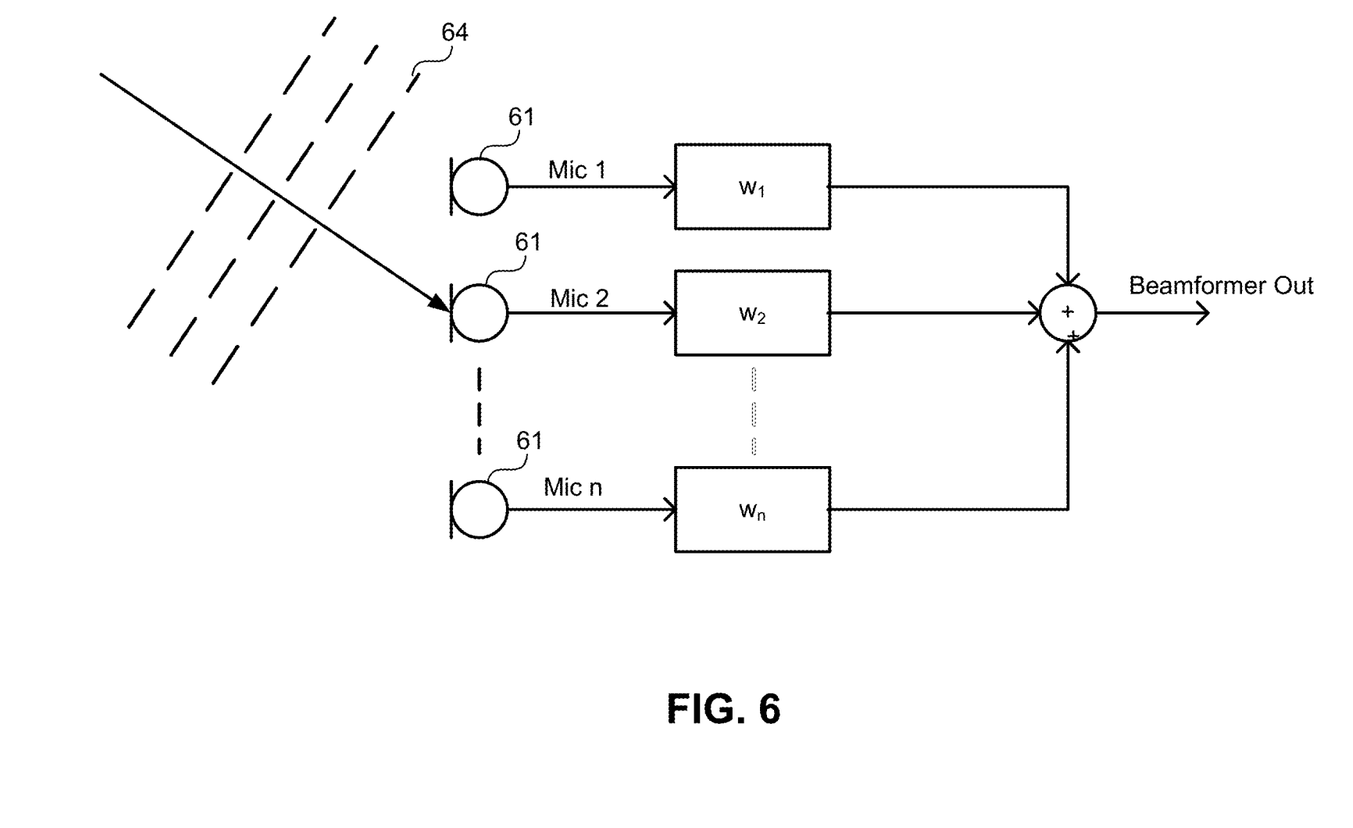
FIG. 6 schematically illustrates an audio beamforming technique for isolating a user's voice.

FIG. 6 schematically illustrates an audio beamforming technique for isolating a user's voice. The technique can use the difference in times of arrival of a sound wavefront 64 at each microphone 61, where a different weight w is applied to the output each microphone 61 in a basic filter-and-sum configuration. The weights can be set so as to create a "direction of interest," where sound not from the direction of interest can be attenuated. Additionally, two omnidirectional microphones can be combined to make a unidirectional assembly, i.e., an "end-fire" beamformer microphone assembly. For an end-fire array, four design parameters generally affect the response: frequency of the directional response and frequency response, distance between the microphones, sampling frequency of the audio circuitry that receives the microphones' outputs, and number of samples of delay applied to the signal from the microphone most distant from the sound source.

Figure 7:
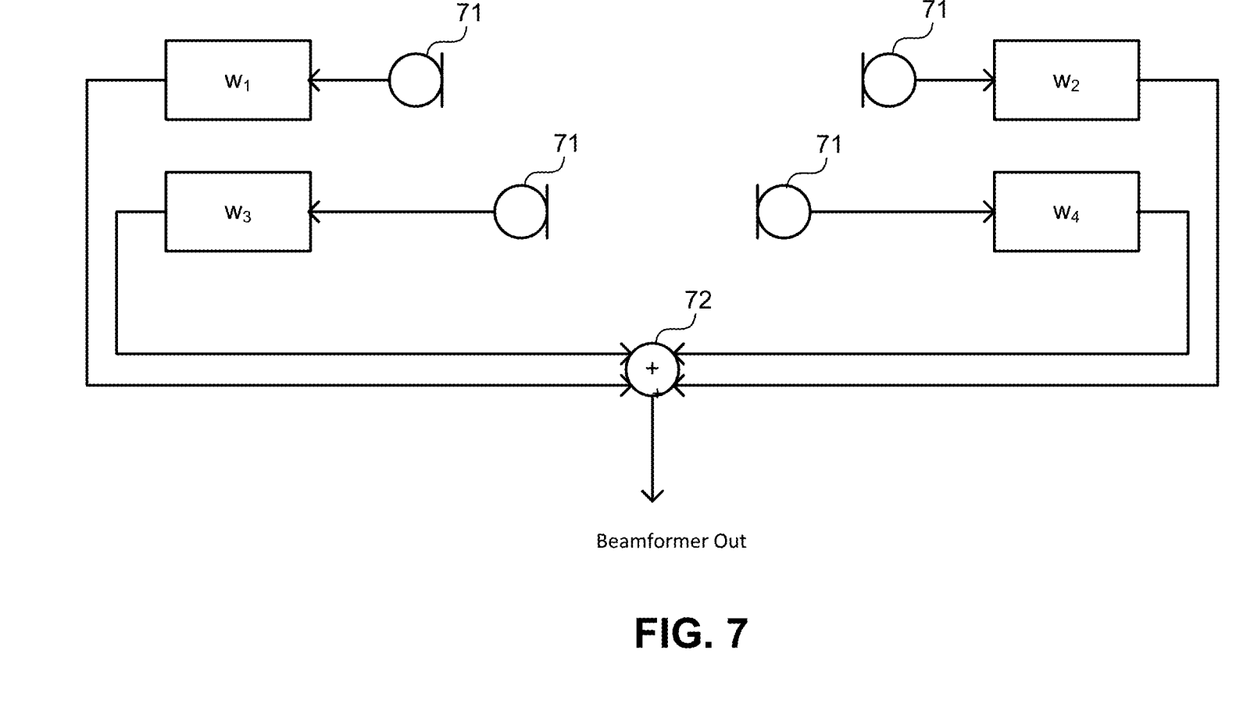
FIG. 7 is a block diagram of an audio subsystem including two end-fire microphone arrays.

FIG. 7 shows how two end-fire subsystems created in the above-described manner can be combined to form a four-microphone beamforming system. The microphones 25 of the AR-HMD 20 can be configured as microphones 71 in FIG. 7. Each microphone's output is applied to a particular weighting function w, the output of which is applied to a summer. The output of the summer is the final output of the beamforming array. In some embodiments, two of the microphones 71 are aligned on one side of the user's face (left or right), while the other two are aligned on the other side of the user's face, and are weighted so as to have an end fire response aligned in the direction of the users mouth.

Figure 8:
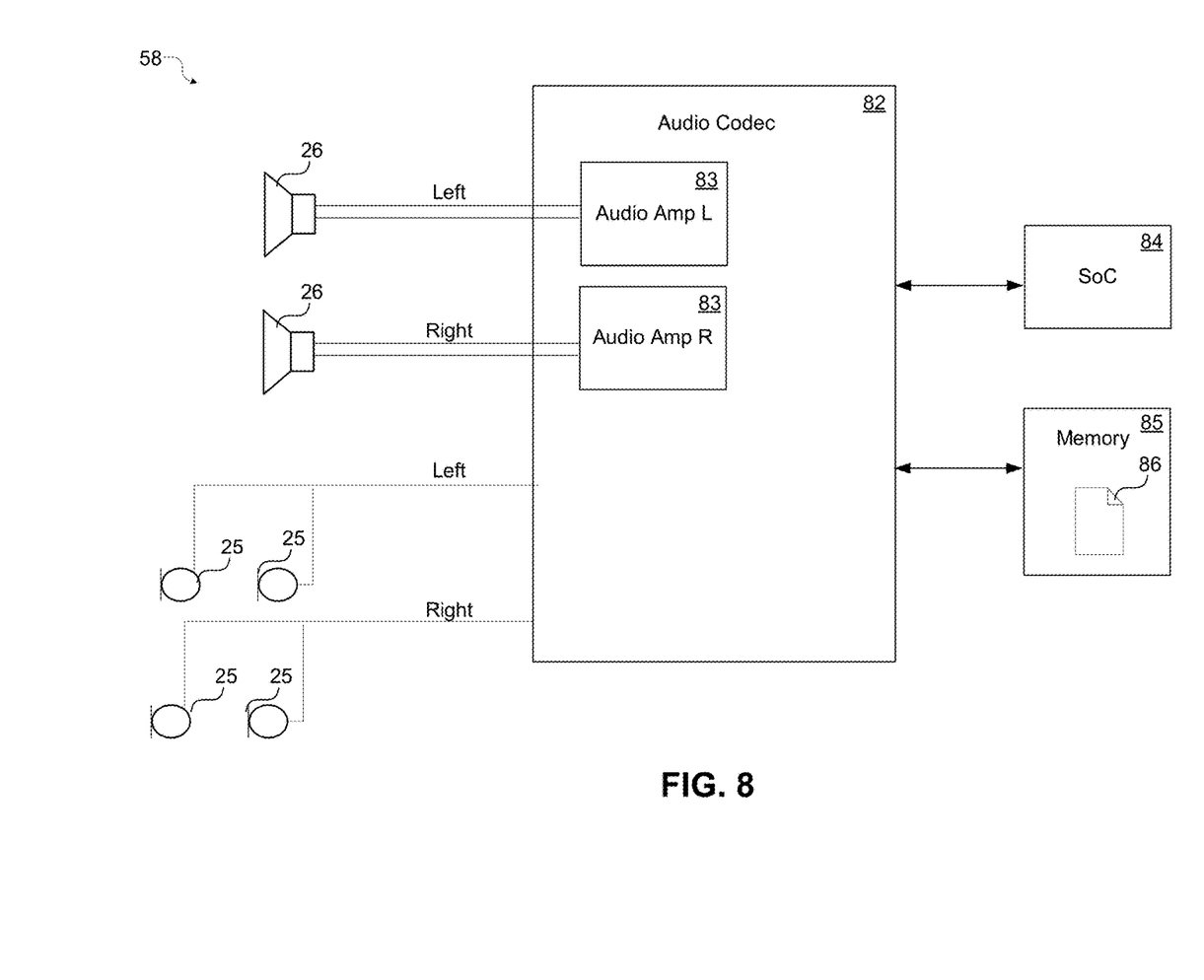
FIG. 8 is a block diagram illustrating an example of the audio subsystem of the AR-HMD device.

FIG. 8 is a block diagram illustrating in greater detail an example of the audio subsystem 58 of the AR-HMD device 20. In the illustrated embodiment, the audio subsystem 58 includes an audio codec 82, a system-on-a-chip (SoC) 84 and memory 85, four microphones 25 arranged into two end-fire beamforming pairs, and a pair of audio speakers 26. The audio codec 82 includes, among other things, an audio amplifier circuit 83 for each of the speakers 26. The SoC 84 is the main controller for the audio codec 82. In certain embodiments, the SoC 84 signals the audio codec 82 when to start voice processing. In other embodiments, at least some of the voice processing may be done by the SoC 84. In some embodiments, the microphones 25 output signals in pulse density modulation (PDM) format. The memory 85 stores data 86 representing one or more audio transforms that can be applied to the user's voice and/or other input sounds, to produce various realistic audio effects (e.g., echo, reverberation, underwater effect, etc.). Additionally, the memory 85 may store HRTF data of the user, which can also be used in producing the audio effects to make them more tailored to the user's anatomy, and therefore, more realistic.

Figure 9:
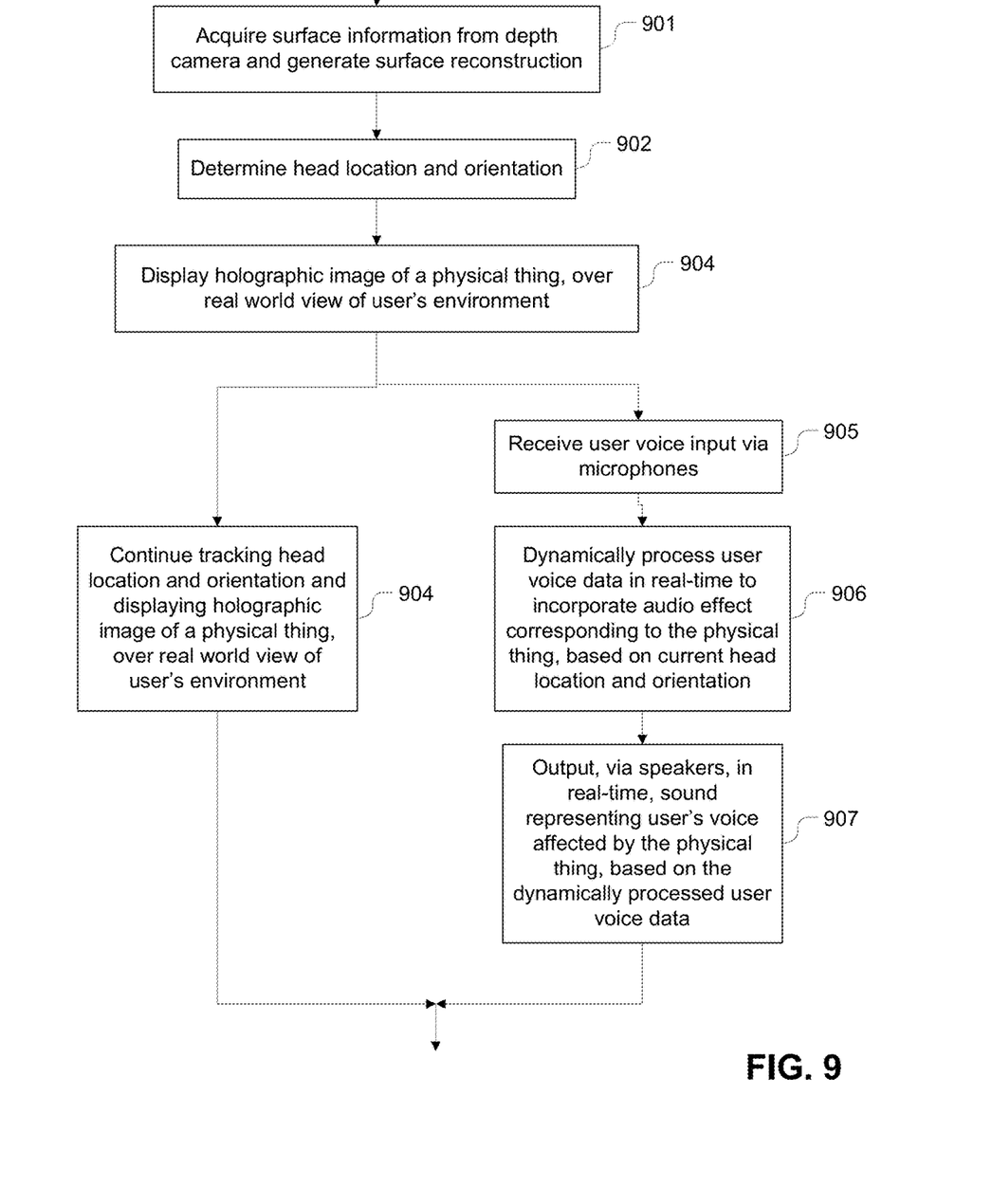
FIG. 9 is a flow diagram showing an example of a process for audio processing according to technique introduced here.

FIG. 9 shows an example of a process for audio processing according to the technique introduced here. Initially, at step 901 the AR-HMD device 20 acquires information about real surfaces in the user's environment from the depth camera and generates a surface reconstruction. The surface reconstruction is a collection of 3D points in space that represent the outline of real world edges and surfaces. Next step 902 the AR-HMD device 20 determines the user's head location and orientation, based on input from the head tracking cameras. The AR-HMD device 20 then displays an image of a physical thing, superimposed over the user's real-world view of the user's environment. The physical thing can be, for example, an object (e.g., the interior of a cathedral) or a substance (e.g., water or gas), or it can be a cavity, gap or hole in an object or substance (e.g., a cave or canyon). The exact nature of the image and the physical thing it depicts depends on the specific application for which the AR-HMD device 20 is currently being used and the AR/VR content provided for that application.

Figure 10:
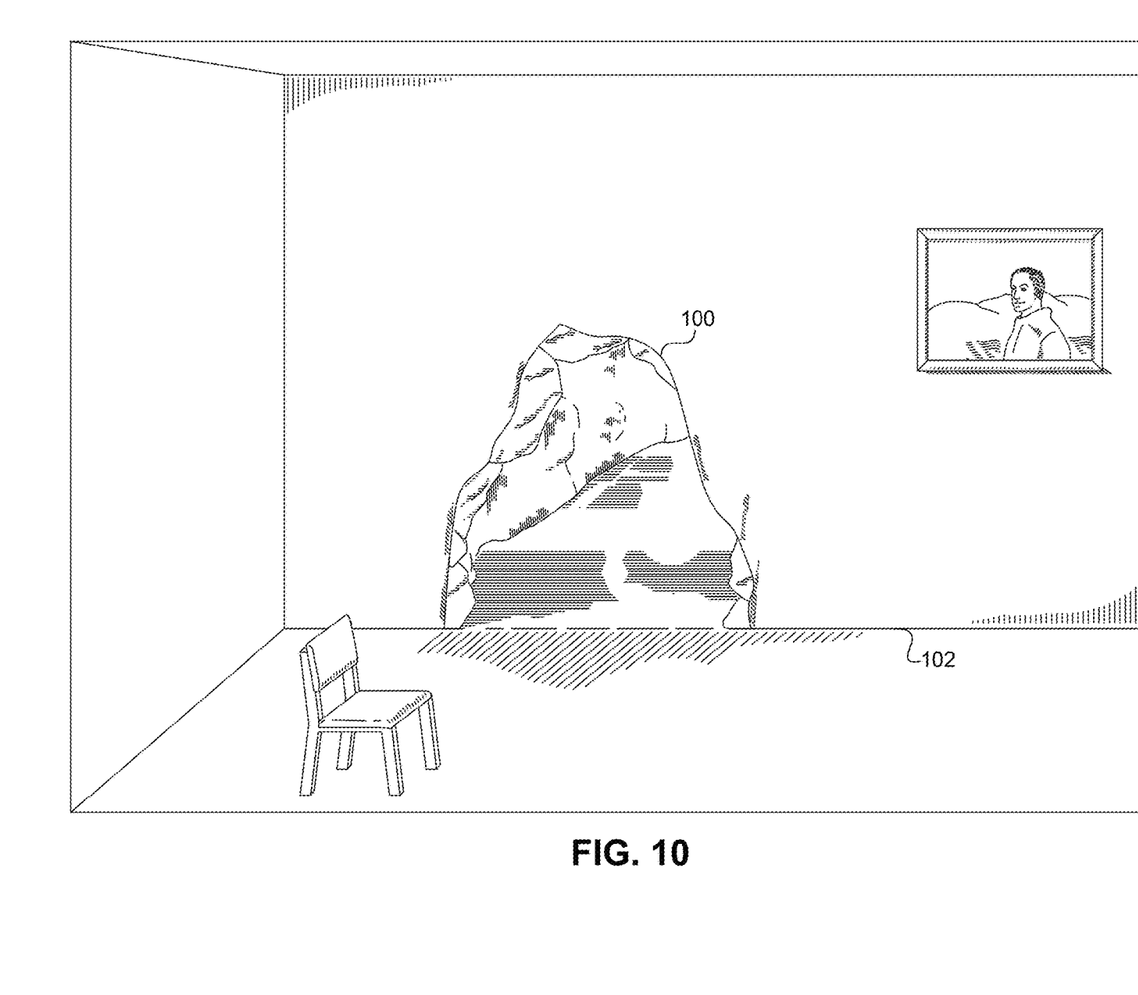
FIG. 10 is an example of a first view including AR content, that can be provided by the AR-HMD device.
Figure 11:
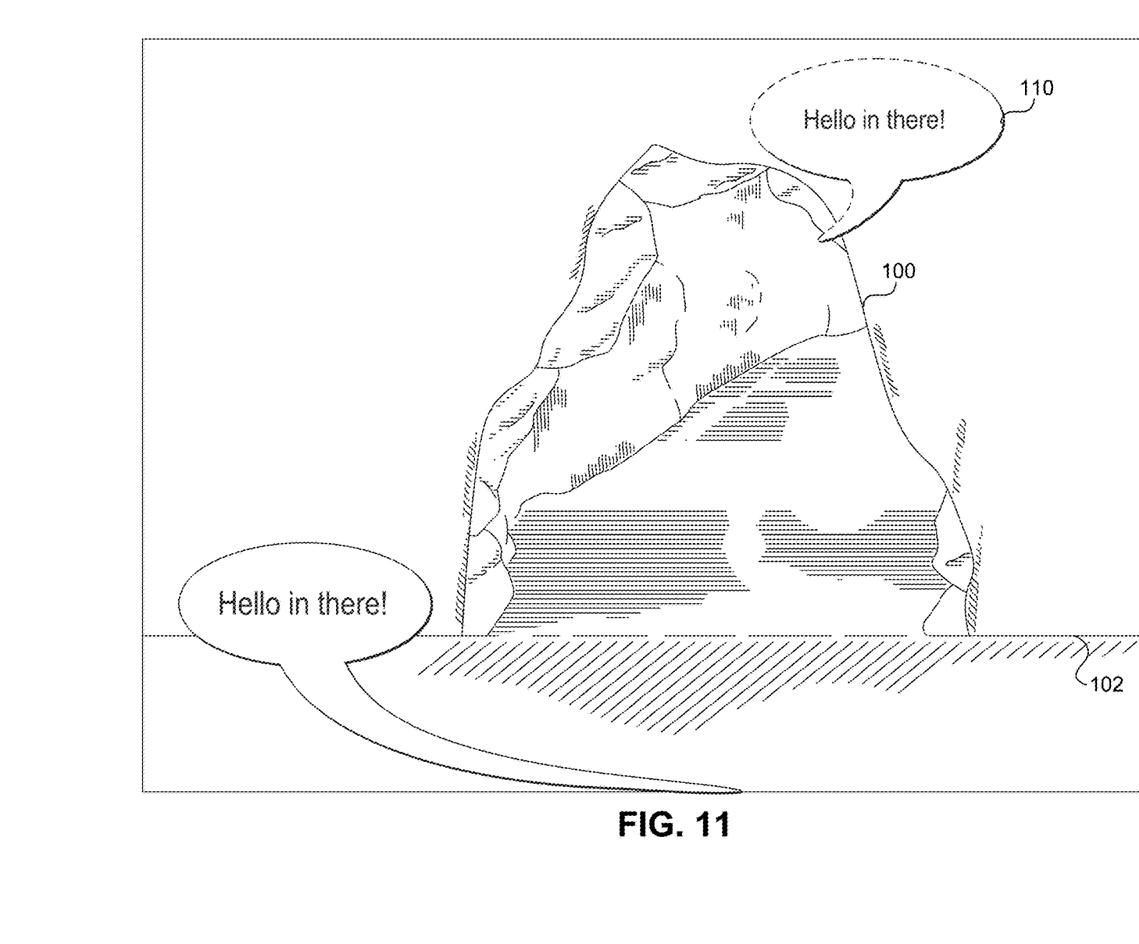
FIG. 11 is an example of a second view including AR content, that can be provided by the AR-HMD device, with an added audio effect.

FIGS. 10 and 11 show a simple example of what a user might see while wearing the AR-HMD device 20, to demonstrate how the audio processing technique can be applied. In this example, the user sees various real-world (physical) objects, including walls of a room in which he is currently located, a chair and wall-mounted artwork. In addition, the AR-HMD device 20 is displaying an image 100 of a cave, making it appear that the entrance to the cave is part of a real wall 102.

Referring back to FIG. 9, once the initial data is acquired and visual scene is established in steps 901 through 903, the AR-HMD device 20 at step 904 continues tracking the user's head location and orientation and displaying the image of the physical thing. At any time while the image is being displayed (step 904), the user may speak an utterance. In that event steps 905 through 907 are performed concurrently with step 904 to handle the utterance. For example, in the scenario of FIGS. 10 and 11, the user may say "Hello in there" while standing near the wall near the location where the holographic cave appears. Ordinarily, a person would not notice any echo from his own speech from a nearby wall. However, by using the audio processing technique introduced here, the AR-HMD device 20 produces output from speakers 26 to allow the user to hear an echo 110 of his own voice that seems to originate from "within" the holographic cave, as illustrated in FIG. 11.

Referring back to FIG. 9, in step 905 the AR-HMD device 20 receives the user voice input (and possibly other uses' beamformed voices) via microphones 25. Next, at step 906 the AR-HMD device 20 converts the analog microphone output signals into digital user voice data, and then dynamically processes the user voice data in real-time to incorporate an audio effect corresponding to the physical thing depicted by the image, based on the user's current head location and orientation. This step may include accessing pre-stored ("canned") audio effect data in the memory 85 of the audio subsystem 58 (FIG. 8) and/or in main memory 22 of the AR-HMD device 20 (FIG. 5), and using the stored data to modify the user voice data. In other instances, however, it may include simply adding a time delay of a fixed amount, such as might be the case when generating a simple echo of the input sound. At step 907 the AR-HMD device 20 outputs, via the speakers 26, in real-time, sound representing user's voice affected by the physical thing, based on the dynamically modified user voice data. Note that steps 905 through 907 are performed in real-time, i.e., with very little delay (e.g., no more than about 50 milliseconds) from the time that the input sound hits the microphones 25 to the time that the corresponding processed audio is output from the speakers 26.

Note that the AR-HMD device 20 uses the head-tracking data to ensure that the processed audio seems to originate from the correct direction. For example, the user might say "Hello in there!" while standing in front of the holographic cave 100 with his head turned slightly away from the cave. In that case, the audio would be processed so that the echo would seem to come more from one side than the other, rather than from directly in front of the user. The apparent (user-perceived) directionality of the output sound can be provided by using conventional techniques, such as selectively varying the delay/phase and/or other parameters of the outputs of the speakers.

EXAMPLES OF CERTAIN EMBODIMENTS

Certain embodiments of the technology introduced herein are summarized in the following numbered examples:
1. A method comprising: displaying, by a head-mounted display device, an image of a physical thing to a user of the head-mounted display device, over a real world view of an environment of the user; inputting voice of the user via a microphone of the head-mounted display device, while the image is being displayed to the user; dynamically processing user voice data representing the voice of the user in real-time to incorporate an audio effect corresponding to the physical thing, while the image is being displayed to the user; and outputting, via a speaker, in real-time, sound representing the voice of the user as affected by the physical thing, based on the dynamically processed user voice data, while the image is being displayed to the user.
2. A method as recited in example 1, wherein a latency between said inputting voice of the user and said outputting sound to the user is less than 75 milliseconds for any particular audio sample of the input voice of the user.
3. A method as recited in example 1 or 2, wherein the physical thing is an object or substance.
4. A method as recited in example 1 or 2, wherein the physical thing is a cavity or hole in an object or substance.
5. A method as recited in any of examples 1 through 4, further comprising: tracking, by the head-mounted display device, at least one of a head location or head orientation of the user; wherein dynamically processing the user voice data is further based on at least one of the head location or head orientation of the user.
6. A method as recited in any of examples 1 through 5, wherein dynamically modifying the user voice data comprises determining a directionality parameter of the modified user voice data, based on at least one of the head location or head orientation of the user.
7. A method as recited in any of examples 1 through 6, further comprising: generating, by the head-mounted display device, a surface reconstruction of the environment of the user; wherein dynamically processing the user voice data is further based on the surface reconstruction.
8. A method as recited in any of examples 1 through 7, wherein dynamically processing the user voice data comprises determining a volume parameter of the modified user voice data, based on at least one of a head location or head orientation of the user.

9. A method as recited in any of examples 1 through 8, wherein dynamically processing the user voice data comprises determining a reverberation parameter of the modified user voice data, based on at least one of a head location or head orientation of the user.

10. A method as recited in any of examples 1 through 9, wherein dynamically processing the user voice data comprises determining an origination direction of a simulated echo of the user's voice, based on at least one of the head location or head orientation of the user.

11. A method of operating a head-mounted display device with audio capability, the method comprising: displaying, by the head-mounted display device, an image depicting a physical thing to a user of the head-mounted display device, such that the image is superimposed over a real world view of a physical environment in which the user is located; inputting voice of the user by using an array of microphones of the head-mounted display device, while the image is being displayed to the user; dynamically modifying user voice data representing the voice of the user to incorporate an audio effect that corresponds to an acoustic property of the physical thing, while the image is being displayed to the user; and outputting sound to the user, via a speaker of the head-mounted display device, based on the modified user voice data, to produce an audible effect applied to the voice of the user corresponding to the acoustic property of the physical thing, while the image is being displayed to the user.

12. A method as recited in example 11, wherein the physical thing is at least one of: an object or substance; or a cavity or hole in an object or substance.

13. A method as recited in example 11 or 12, further comprising: tracking, by the head-mounted display device, at least one of a head location or head orientation of the user; wherein dynamically modifying the user voice data is further based on at least one of the head location or head orientation of the user.

14. A method as recited in any of examples 11 through 13, further comprising: obtaining a surface reconstruction of the physical environment in which the user is located, wherein dynamically modifying the user voice data is further based on the surface reconstruction.

15. A head-mounted display device comprising: a head fitting by which to mount the head-mounted display device to the head of a user; a display element, coupled to the head fitting and configured to display to the user an image on a real-world view of an environment of the user, the image depicting a physical thing; a plurality of microphones to input voice of the user while the image is being displayed to the user; a processor configured to access the audio data and to dynamically modify user voice data representing the voice of the user in real-time to incorporate an audio effect corresponding to the physical thing, while the image is being displayed to the user; and a speaker subsystem to output sound to the user based on the modified user voice data while the image is being displayed to the user, the sound representing the voice of the user as affected by the physical thing.

16. A method as recited in example 15, wherein the plurality of microphones comprises a plurality of omnidirectional microphones configured in an end-fire array.

17. A method as recited in example 15, wherein the physical thing is at least one of: an object or substance; or a cavity or hole in an object or substance.

18. A method as recited in any of examples 15 through 17, further comprising: a head-tracking subsystem to track a current head location and head orientation of the user; and a surface mapping subsystem to identify locations of physical surfaces in the environment of the user and to generate a surface reconstruction based on the identified locations of physical surfaces; wherein the processor is configured to dynamically modify the user voice data further based on at least one of the head location or head orientation of the user.

19. A method as recited in any of examples 15 through 18, wherein the processor is configured to modify the user voice data based on the surface reconstruction.

20. A method as recited in any of examples 15 through 19, wherein dynamically modifying the user voice data comprises determining at least one of: a directionality parameter of the modified user voice data, based on at least one of the head location or head orientation of the user; a volume parameter of the modified user voice data, based on at least one of the head location or head orientation of the user; or a reverberation parameter of the modified user voice data, based on at least one of the head location or head orientation of the user.

21. A head-mounted display device comprising: means for displaying an image of a physical thing to a user of the head-mounted display device, over a real world view of an environment of the user; means for inputting voice of the user via a microphone of the head-mounted display device, while the image is being displayed to the user; means for dynamically processing user voice data representing the voice of the user in real-time to incorporate an audio effect corresponding to the physical thing, while the image is being displayed to the user; and means for outputting, via a speaker, in real-time, sound representing the voice of the user as affected by the physical thing, based on the dynamically processed user voice data, while the image is being displayed to the user.

22. A head-mounted display device as recited in example 21, wherein a latency between said inputting voice of the user and said outputting sound to the user is less than 75 milliseconds for any particular audio sample of the input voice of the user.

23. A head-mounted display device as recited in example 21 or 22, wherein the physical thing is an object or substance.

24. A head-mounted display device as recited in any of examples 21 through 23, wherein the physical thing is a cavity or hole in an object or substance.

25. A head-mounted display device as recited in any of examples 21 through 24, further comprising: means for tracking at least one of a head location or head orientation of the user; wherein dynamically processing the user voice data is further based on at least one of the head location or head orientation of the user.

26. A head-mounted display device as recited in any of examples 21 through 25, wherein dynamically modifying the user voice data comprises determining a directionality parameter of the modified user voice data, based on at least one of the head location or head orientation of the user.

27. A head-mounted display device as recited in any of examples 21 through 26, further comprising: means for generating a surface reconstruction of the environment of the user; wherein dynamically processing the user voice data is further based on the surface reconstruction.

28. A head-mounted display device as recited in any of examples 21 through 27, wherein dynamically processing the user voice data comprises determining a volume parameter of the modified user voice data, based on at least one of a head location or head orientation of the user.

29. A head-mounted display device as recited in any of examples 21 through 28, wherein dynamically processing the user voice data comprises determining a reverberation parameter of the modified user voice data, based on at least one of a head location or head orientation of the user.

30. A head-mounted display device as recited in any of examples 21 through 29, wherein dynamically processing the user voice data comprises determining an origination direction of a simulated echo of the user's voice, based on at least one of the head location or head orientation of the user.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   displaying, by a head-mounted display device, an image of a physical thing to a user of the head-mounted display device, wherein the physical thing is not actually present in a real-world environment of the user;
   receiving sound via a plurality of microphones of the head-mounted display device, while the image of the physical thing is being displayed to the user;
   isolating a voice of the user from the sound based on audio beamforming and weighted directional interest for each of the plurality of microphones;
   dynamically processing user voice data representing the voice of the user in real-time to incorporate an audio effect corresponding to the physical thing, while the image of the physical thing is being displayed to the user; and
   outputting, via a speaker, in real-time, sound representing the voice of the user as would be affected by the physical thing if the physical thing were actually present in the real-world environment of the user, based on the dynamically processed user voice data, while the image of the physical thing is being displayed to the user.

2. The method as recited in claim 1, wherein a latency between said inputting voice of the user and said outputting sound to the user is in the range of about 50 milliseconds to about 75 milliseconds for any particular audio sample of the input voice of the user.

3. The method as recited in claim 1, wherein the physical thing is an object or substance.

4. The method as recited in claim 1, wherein the physical thing is a cavity or hole in an object or substance.

5. The method as recited in claim 1, further comprising:
   tracking, by the head-mounted display device, at least one of a head location or head orientation of the user;
   wherein dynamically processing the user voice data is further based on at least one of the head location or head orientation of the user.

6. The method as recited in claim 5, wherein dynamically processing the user voice data comprises determining a directionality parameter of the user voice data, based on at least one of the head location or head orientation of the user.

7. The method as recited in claim 5, further comprising:
   generating, by the head-mounted display device, a surface reconstruction of the environment of the user;
   wherein dynamically processing the user voice data is further based on the surface reconstruction.

8. The method as recited in claim 1, wherein dynamically processing the user voice data comprises determining a volume parameter of the user voice data, based on at least one of a head location or head orientation of the user.

9. The method as recited in claim 1, wherein dynamically processing the user voice data comprises determining a reverberation parameter of the user voice data, based on at least one of a head location or head orientation of the user.

10. The method as recited in claim 1, wherein dynamically processing the user voice data comprises determining an origination direction of a simulated echo of the user's voice, based on at least one of the head location or head orientation of the user.

11. A method of operating a head-mounted display device with audio capability, comprising:
    displaying, by the head-mounted display device, an image depicting a physical thing to a user of the head-mounted display device, wherein the physical thing is not actually present in the environment of the user;
    receiving sound via an array of microphones of the head-mounted display device, while the image of the physical thing is being displayed to the user;
    isolating a voice of the user from the sound based on audio beamforming and weighted directional interest for each of the plurality of microphones;
    dynamically modifying user voice data representing the voice of the user to incorporate an audio effect that corresponds to an acoustic property of the physical thing, while the image of the physical thing is being displayed to the user; and
    outputting sound to the user, via a speaker of the head-mounted display device, based on the modified user voice data, to produce an audible effect applied to the voice of the user corresponding to the acoustic property of the physical thing, while the image of the physical thing is being displayed to the user.

12. The method as recited in claim 11, wherein the physical thing is at least one of:
    an object or substance; or
    a cavity or hole in an object or substance.

13. The method as recited in claim 11, further comprising:
    tracking, by the head-mounted display device, at least one of a head location or head orientation of the user;

wherein dynamically modifying the user voice data is further based on at least one of the head location or head orientation of the user.

14. The method as recited in claim 13, further comprising:
obtaining a surface reconstruction of the physical environment in which the user is located, wherein dynamically modifying the user voice data is further based on the surface reconstruction.

15. A head-mounted display device comprising:
a head fitting by which to mount the head-mounted display device to the head of a user;
a display element, coupled to the head fitting and configured to display to the user an image, the image depicting a physical thing that is not actually present in a real-world environment of the user;
a plurality of microphones to receive sound while the image of the physical thing is being displayed to the user;
a processor configured to:
isolate a voice of the user from the sound based on audio beamforming and weighted directional interest for each of the plurality of microphones; and
access and dynamically modify user voice data representing the voice of the user in real-time to incorporate an audio effect corresponding to the physical thing, while the image of the physical thing is being displayed to the user; and
a speaker subsystem to output sound to the user based on the modified user voice data while the image of the physical thing is being displayed to the user, the sound representing the voice of the user as would be affected by the physical thing if the physical thing were actually present in the real-world environment of the user.

16. The head-mounted display device as recited in claim 15, wherein the plurality of microphones comprises a plurality of omnidirectional microphones configured in an end-fire array.

17. The head-mounted display device as recited in claim 15, wherein the physical thing is at least one of:
an object or substance; or
a cavity or hole in an object or substance.

18. The head-mounted display device as recited in claim 15, further comprising:
a head-tracking subsystem to track a current head location and head orientation of the user; and
a surface mapping subsystem to identify locations of physical surfaces in the environment of the user and to generate a surface reconstruction based on the identified locations of physical surfaces;
wherein the processor is configured to dynamically modify the user voice data further based on at least one of the head location or head orientation of the user.

19. The head-mounted display device as recited in claim 18, wherein the processor is configured to modify the user voice data based on the surface reconstruction.

20. The head-mounted display device as recited in claim 18, wherein dynamically modifying the user voice data comprises determining at least one of:
a directionality parameter of the modified user voice data, based on at least one of the head location or head orientation of the user;
a volume parameter of the modified user voice data, based on at least one of the head location or head orientation of the user; or
a reverberation parameter of the modified user voice data, based on at least one of the head location or head orientation of the user.

* * * * *